P. TIEPOLT.
LADDER AND STEP.
APPLICATION FILED AUG. 14, 1907.

No. 901,755.

Patented Oct. 20, 1908.

3 SHEETS—SHEET 1.

Witnesses:
P. F. Nagle.
H. G. Dieterich

Inventor
Paul Tiepolt,
By Wiederheim Fairbanks
Attorneys.

P. TIEPOLT.
LADDER AND STEP.
APPLICATION FILED AUG. 14, 1907.
901,755.
Patented Oct. 20, 1908.
3 SHEETS—SHEET 2.
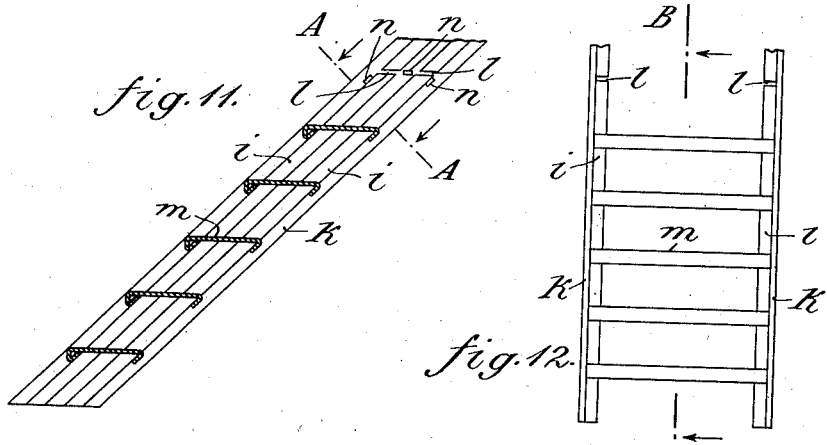
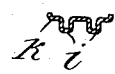
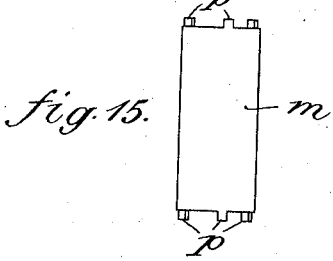
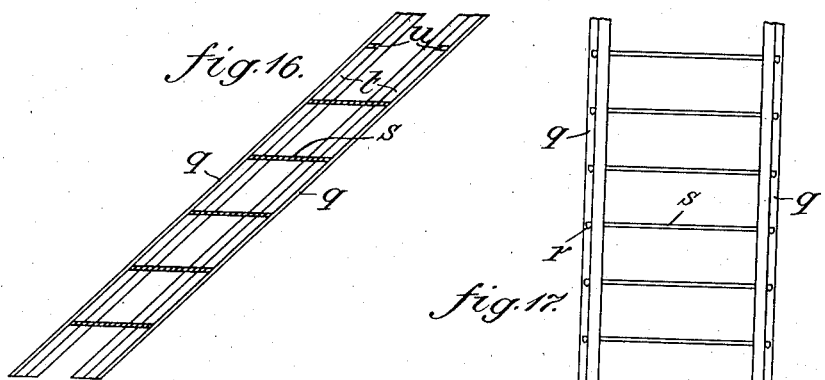
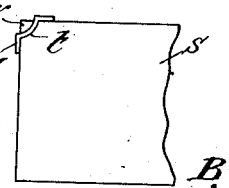
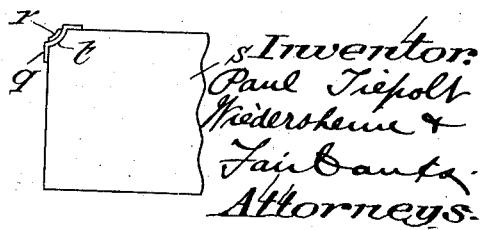
Witnesses:
P. F. Nagle
H. G. Dieterich
Inventor:
Paul Tiepolt
Wiedersheim &
Fairbanks
By Attorneys.

P. TIEPOLT.
LADDER AND STEP.
APPLICATION FILED AUG. 14, 1907.

901,755.

Patented Oct. 20, 1908.

3 SHEETS—SHEET 3.

Witnesses:
P. F. Nagle
H. S. Dieterich

Inventor:
Paul Tiepolt
By Niedershein Fairbanks
Attorneys.

UNITED STATES PATENT OFFICE.

PAUL TIEPOLT, OF COLOGNE-LINDENTHAL, GERMANY.

LADDER AND STEP.

No. 901,755.    Specification of Letters Patent.    Patented Oct. 20, 1908.

Application filed August 14, 1907. Serial No. 388,478.

*To all whom it may concern:*

Be it known that I, PAUL TIEPOLT, engineer, a subject of the King of Prussia, residing at No. 44 Wittgensteinstrasse, Cologne-Lindenthal, German Empire, have invented new and useful Improvements in Ladders and Steps, of which the following is a specification.

My invention relates to a metal ladder or steps, the parts comprising which, that is, the side pieces or rails and the rungs or treads, for the sake of lightness are made of thin-walled material.

The prior methods of fastening adopted for such thin walled parts of figured metal bars do not meet the requirements which must be made of a ladder in respect to stability, since the crossing surfaces formed by the side rails and rungs are too small to support the latter. To remedy this drawback I provide the side pieces or rails with means whereby a relatively large supporting surface is presented to the rungs or treads. For this purpose the side pieces are furnished with one or more longitudinal ribs, or with bosses, or depressions, which offer a relatively large supporting-surface to the thin walled rungs or treads. The rungs are secured to the side rails by lugs, provided on the former, being inserted through corresponding slots in the side rails and then turned over.

Several forms of construction of the invention are illustrated in the accompanying drawings.

Figure 1:
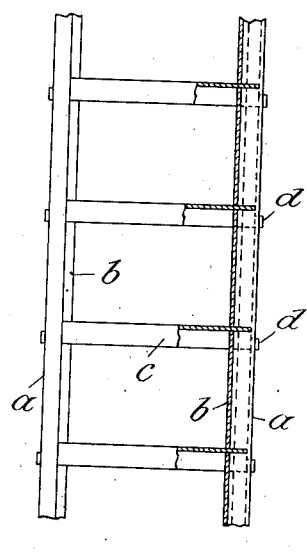
Figure 2:
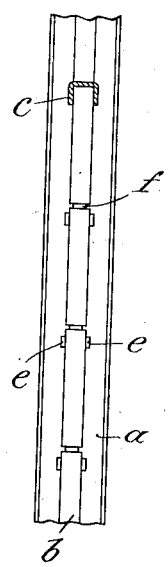
Figure 6:
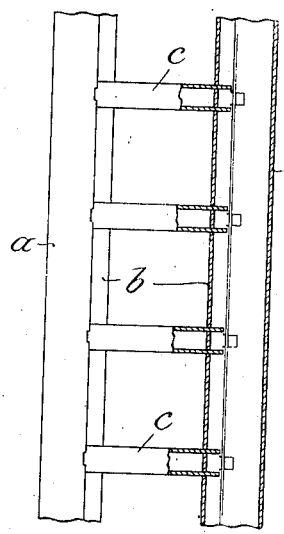
Figure 7:
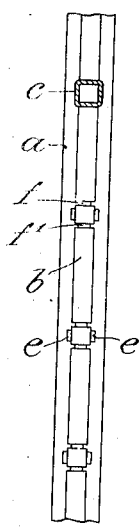
Figure 3:
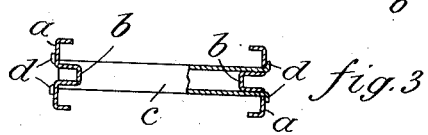
Figure 8:
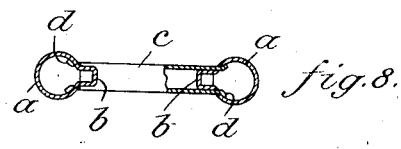
Figure 4:
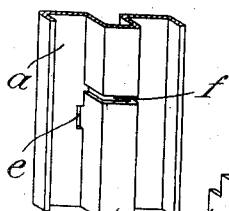
Figure 5:
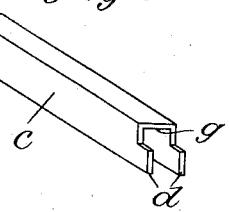
Figure 9:
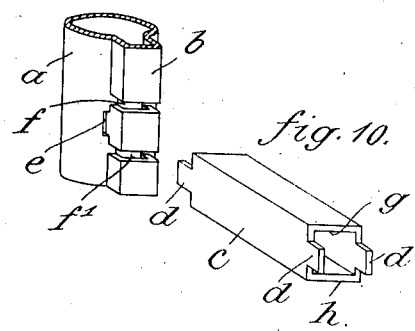
Figure 10:
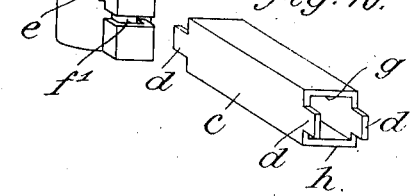
Figure 20:
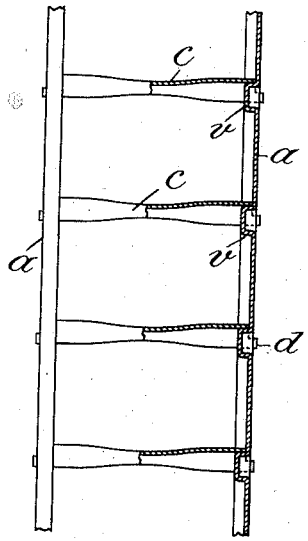
Figure 21:
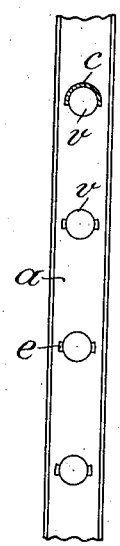
Figure 22:
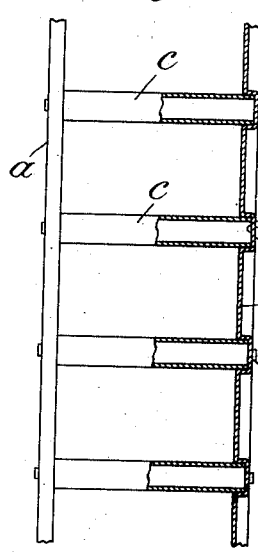
Figure 23:
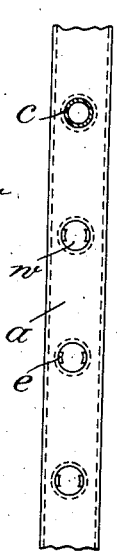
Figure 24:
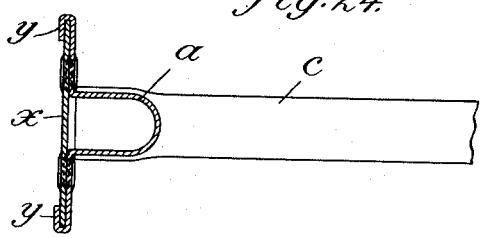
Figure 25:
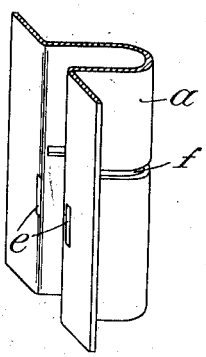
Figure 26:
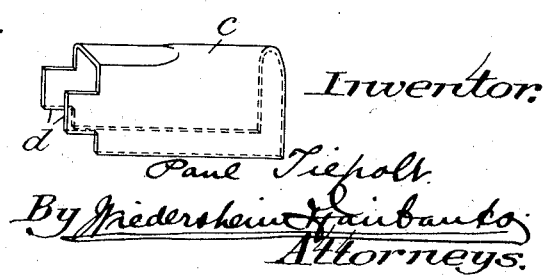

Figure 1 is an elevation and part section of a ladder. Fig. 2 is a side elevation of one of the side rails. Fig. 3 is a cross section through the ladder. Figs. 4 and 5 are detail views drawn to a larger scale and showing in perspective respectively a fragment of one of the side rails and a rung. Fig. 6 is an elevation and part section of a portion of a modified construction of ladder. Fig. 7 is a side elevation of one of the side rails. Fig. 8 is a cross section of the ladder. Figs. 9 and 10 are detail views drawn to a larger scale and showing in perspective respectively a fragment of one of the side rails and a rung. Fig. 11 is a section of a portion of a step constructed according to my invention, the section being on the line B—B of Fig. 12. Fig. 12 is a front elevation of the same. Fig. 13 is a section on the line A—A of Fig. 11. Fig. 14 is an end elevation and Fig. 15 a plan of one of the treads. Fig. 16 is a section through a portion of a modified construction of steps. Fig. 17 is a front elevation thereof. Fig. 18 is a plan of a fragment of a tread inserted into one of the side rails. Fig. 19 is a like view after the tread corner has been turned over. Fig. 20 is a section through another modification of the ladder. Fig. 21 is a side elevation of one of the side rails. Figs. 22 and 23 are similar views of a modification of this ladder. Fig. 24 is a horizontal section of a fragment of another modification of the ladder. Figs. 25 and 26 are perspective views of parts of one of the rails and of a rung respectively.

Referring more particularly to Figs. 1–5, each side rail $a$ is provided with a central rib $b$. The rungs $c$ are of channel section and present lugs $d$, corresponding to slots $e$ in the rails $a$. The ribs $b$ of the rails $a$ are furnished with slots $f$, corresponding to the thickness of the rungs $c$. To secure the rungs to the rails, the former are pressed against the latter in such manner that the ends $g$ of the rungs rest upon the ribs $b$ of the rails, the lugs $d$ projecting through the slots $e$, whereupon the lugs are hammered over. In this manner a relatively large supporting surface is presented to the rungs, and great rigidity thus attained, despite the employment of thin walled, light material.

In the metal ladder shown in Figs. 6–10 the side rails $a$ are tubular and the rungs $c$ are of box section. The ribs $b$ of the rails $a$ are furnished with two slots $f$ $f^1$, corresponding to the cross section of the rungs $c$, so that when assembled, the surfaces $g$ $h$ of the rung ends rest upon the ribs $b$. The lugs $d$ of the rungs $c$ are pushed through the slots $e$ of the rails $a$ and are then hammered over in the same manner as with the ladder illustrated in Figs. 1–5.

Figs. 11–15 show steps constructed according to my invention. The ribs $i$ of the side pieces $k$ are provided with slots $l$ corresponding to the thickness of the treads $m$. They are also furnished with slots $n$ which correspond to the lugs $p$ of the treads $m$.

In the steps shown in Figs. 16–19, the sides each consist of two quadrants $q$. The corners $r$ of the treads $s$ are pushed through slots $u$ in the curved portions $t$, and then bent over, so that the treads can not be drawn out again.

Figs. 20 and 21 illustrate a ladder the side rails a of which are provided with hollow bosses or elevations v, in order to present an ample supporting surface for the rungs c.

In the ladder shown in Figs. 22 and 23 a large supporting-surface for the rungs c is attained by the rails a being provided with depressions w. The rungs may be secured to the rails by means of lugs and slots in the manner already described.

In Figs. 24, 25 and 26 another form of construction of the ladder is shown. To prevent the lugs d being accidentally bent up and the rungs c being pulled out of the rails a, a metal strip x is applied over the bent down lugs d and the edges y of the rails a then turned over upon the same. The metal strip serves at the same time to stiffen the rail a.

Having thus described my invention, I claim as new and desire to secure by Letters Patent:—

1. A ladder or step, comprising longitudinally ribbed thin walled metal side-pieces, and thin walled metal rungs fitting into said side-pieces and having portions receiving and embracing the ribs thereof, substantially as described.

2. A ladder or steps, comprising thin walled slotted metal side pieces, presenting elevated portions and thin walled metal rungs receiving and embracing and supported by said elevated portions and presenting lugs fitting into said slots and bent over at the back, substantially as described.

3. A ladder or steps, comprising thin walled slotted metal side-pieces presenting elevated portions, thin walled metal rungs supported by said elevated portions and presenting lugs fitting into said slots and bent over at the back, and a back-plate covering said lugs and embraced by the overturned edges of the side-piece, substantially as described.

In witness whereof I have hereunto signed my name this 9th day of July, 1907, in the presence of two subscribing witnesses.

PAUL TIEPOLT.

Witnesses:
  ALBERT BRÜDZ,
  WM. VANDORN.